Oct. 25, 1927.
L. E. LA BRIE
1,647,007
VEHICLE HAVING BRAKES
Filed Oct. 14. 1925
2 Sheets-Sheet 1
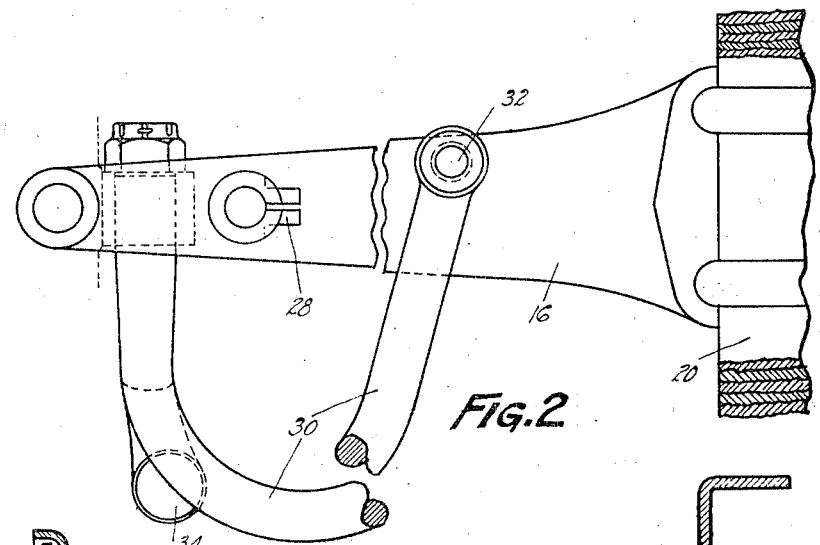
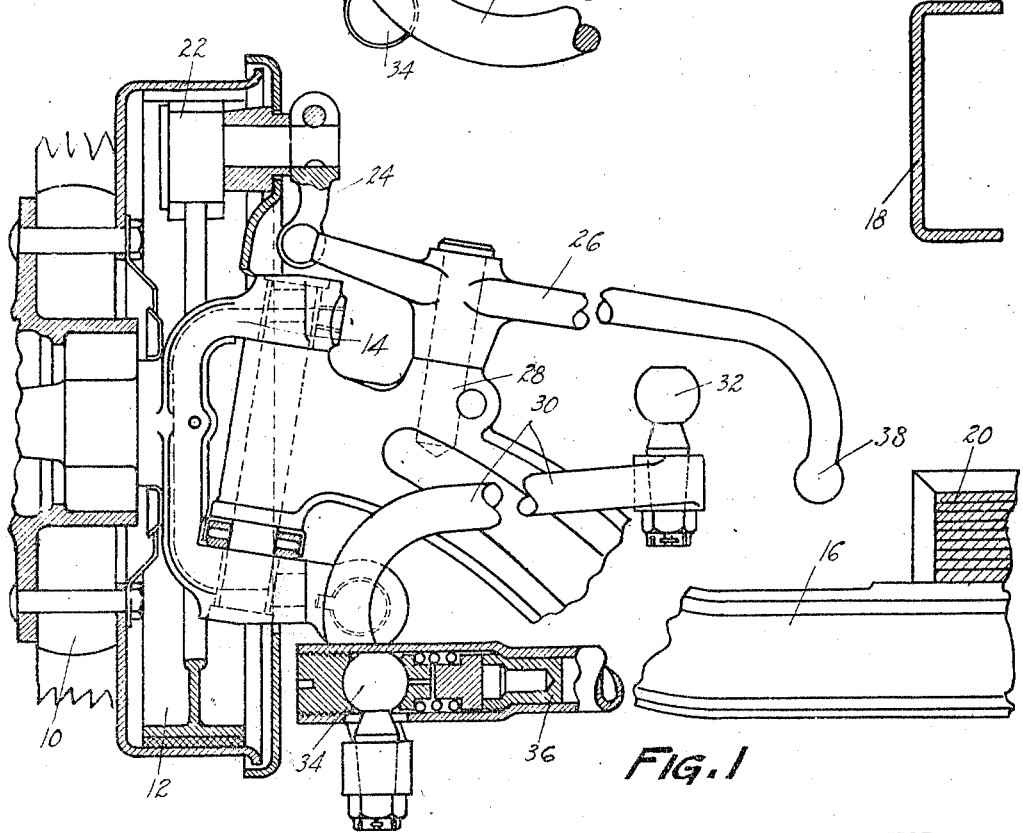
INVENTOR
LUDGER E. LA BRIE
BY
*Jn.W.McConkey*
ATTORNEY Oct. 25, 1927.  
L. E. LA BRIE  
1,647,007  
VEHICLE HAVING BRAKES  
Filed Oct. 14, 1925  
2 Sheets-Sheet 2

INVENTOR  
LUDGER E. LaBRIE  
BY  
*M. W. McConkey*  
ATTORNEY

Patented Oct. 25, 1927.

1,647,007

UNITED STATES PATENT OFFICE.

LUDGER ELIZÉ LA BRIE, OF SOUTH BEND, INDIANA, ASSIGNOR TO BENDIX BRAKE COMPANY, OF CHICAGO, ILLINOIS, A CORPORATION OF ILLINOIS.

VEHICLE HAVING BRAKES.

Application filed October 14, 1925. Serial No. 62,477.

This invention relates to vehicle brakes, and is illustrated as embodied in an automobile chassis having brakes on all four wheels. An object of the invention is to arrange the various operating connections so that they will not interfere with each other, and at the same time to arrange the active position of a brake-applying joint so that the brake is not affected by "axle roll",—i. e. by distortion of the springs due to braking torque and the like. Preferably this is done by moving into the axis of that distortion in applying the brake a joint at the end of a brake-applying lever, shown fulcrumed between its ends on the axle, and which in one very simple and efficient arrangement has a brake-applying joint at its opposite end which is moved in applying the brake substantially into the swivelling axis of the wheel.

The arrangement of the parts, and particularly of the wheel-swivelling steering arm, to get the necessary clearances, and other novel and desirable details of construction, will be apparent from the following description of the arrangements shown in the accompanying drawings, in which:

Fig. 1 is a vertical section through one front brake and associated parts, showing the front axle in rear elevation;

Fig. 2 is a top plan view of part of the axle and part of the steering arm; and

Figure 3:
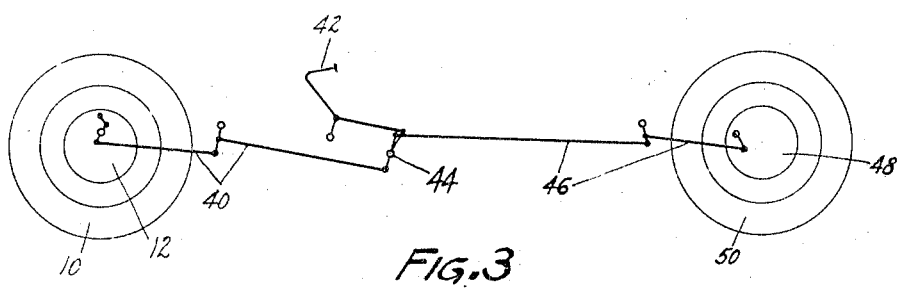
Figs. 3 and 4 are diagrammatic longitudinal sections through two chassis, showing the brake-operating connections generally.

In the arrangement illustrated, the front wheels 10 having brakes 12 are rotatably mounted on knuckles 14 swivelled at the ends of the front axle 16. Axle 16, together with the rear axle, supports the chassis frame 18 by means of springs 20, shown as semi-elliptic springs clipped at their centers to the axles.

Each brake 12 is applied by means such as a cam 22 rocked by an arm 24 having a plane surface at its end engaged by the ball end of a horizontal lever 26 fulcrumed between its ends on a boss 28 on axle 16. The joint between lever 26 and arm 24 moves in applying the brake from an idle position spaced rearwardly from the swivelling axis of the wheel horizontally forward to an active position substantially in that axis.

Knuckle 14 is operated, to swivel the wheel in steering, by a steering arm 30 having a deep curve to clear the axle and boss 28 in all positions of the wheel, and terminating in a ball member 32 forming part of a universal joint connecting the arm to the usual drag link or the like from the steering column. The steering arm also carries a ball member 34 for connection with the cross tie rod 36 for swivelling the right front wheel. The joint at the end of steering arm 26 moves horizontally between lever 26 and axle 16, and in normal position, with the wheels straight ahead, is just above the axle.

Figure 4:
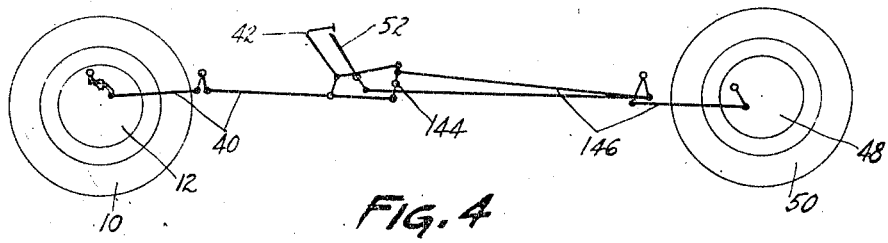

Lever 26 is arranged above lever 30, so that there is no interference, and at its inner end bends vertically downward and terminates in a ball end 38 forming part of a universal joint connecting the arm to one of the front brake connections 40 (Figs. 3 and 4). This joint moves, when the brake is applied, horizontally into the axis of the "axle roll",—i. e. into the axis about which the axle twists when spring 20 is distorted as described,—so that the axle roll does not affect the brake. This axis in the illustrated arrangement of parts is substantially in the center plane of axle 16, just at the upper edge of spring 20.

In the hookup of Fig. 3, a pedal 42 rocks a shaft 44 which operates both the front brake connections 40 and the connections 46 to the brakes 48 on the rear wheels 50. In the hookup of Fig. 4, the pedal 42 rocks a shaft 144 operating both the front brake connections 40 and the rear brake connections 146, the latter embodying any suitable lost-motion connection, whereas the emergency lever 52 operates through a lost-motion connection the rear brakes 48 only.

It will be seen that the front wheels are driven through the springs 20, giving in effect a "Hotchkiss drive" for the front wheels, and that under the heavy torque of the brakes, when applied, the front axle will tend to "roll" or twist about an axis which in the illustrated arrangement is at the upper edges of springs 20 just above the axle, which makes it substantially coincident with the axes of the wheels. The brakes are not affected by this "axle roll," however, since the joints at the inner ends of levers 26 are brought substantially into this axis.

It is not my intention to limit the scope of the invention to the particular constructions illustrated in the drawings, or otherwise than by the terms of the appended claims.

I claim:

1. A vehicle having an axle, a wheel having a brake swivelled at the end of the axle, and a chassis-supporting spring engaging the axle and distorted by the torque of the brake when applied, and comprising, in combination therewith, brake-operating connections including two joints, one of which is moved in applying the brake from an idle position spaced from the swivelling axis of the wheel to an active position substantially in that axis, and the other of which is moved in applying the brake from an idle position spaced from the axis about which the axle twists when the spring is distorted to an active position in that axis.

2. A vehicle having an axle, a wheel having a brake swivelled at the end of the axle, and a chassis-supporting spring engaging the axle and distorted by the torque of the brake when applied, and comprising, in combination therewith, brake-operating connections including a lever operated to apply the brake by a joint moved from an idle position spaced from the axis about which the axle twists when the spring is distorted to an active position substantially in that axis.

3. A vehicle having an axle, a wheel having a brake swivelled at the end of the axle, and a chassis-supporting spring engaging the axle and distorted by the torque of the brake when applied, and comprising, in combination therewith, brake-operating connections including a lever fulcrumed on the axle and operated to apply the brake by a joint moved from an idle position spaced from the axis about which the axle twists when the spring is distorted to an active position substantially in that axis.

4. A vehicle having an axle with a wheel having a brake, and a chassis supporting spring engaging the axle, and comprising, in combination therewith, a brake-applying lever movable in applying the brake substantially horizontally to move its end from an idle position spaced from the axis about which the axle twists as the spring is distorted by the braking torque to an active position substantially in that axis.

5. A vehicle having an axle with a wheel having a brake, and a chassis supporting spring engaging the axle, and comprising, in combination therewith, a brake-applying lever movable in applying the brake substantially horizontally to move its end to an active position substantially at the upper edge of the spring above the axle.

6. A vehicle having an axle, a wheel having a brake swivelled at the end of the axle, and a chassis-supporting spring engaging the axle and distorted by the torque of the brake when applied, and comprising, in combination therewith, a wheel-swivelling steering lever and a brake-applying lever bent to clear each other in all positions and both terminating in joints above the axle, the joints of both levers being arranged when the brake is applied and the wheel is straight ahead side by side approximately in the axis about which the axle twists when the spring is distorted by the braking torque.

7. A vehicle having an axle, a wheel having a brake swivelled at the end of the axle, and a chassis-supporting spring engaging the axle and distorted by the torque of the brake when applied, and comprising, in combination therewith, a brake-applying lever fulcrumed between its ends on the axle and having an operating joint arranged when the brake is applied substantially at the upper edge of the spring above the axle, and a wheel-swivelling steering lever bent in a horizontal plane to clear the fulcrum of the brake-applying lever in all positions of the wheel and having an operating joint at its end moving horizontally above the axle without interfering with the brake-applying lever, the brake-applying lever being above the steering lever and bent vertically downward at its end and terminating between the spring and the end of the steering lever, just above the axle.

In testimony whereof, I have hereunto signed my name.

LUDGER ELIZÉ LA BRIE.